Figure 1:
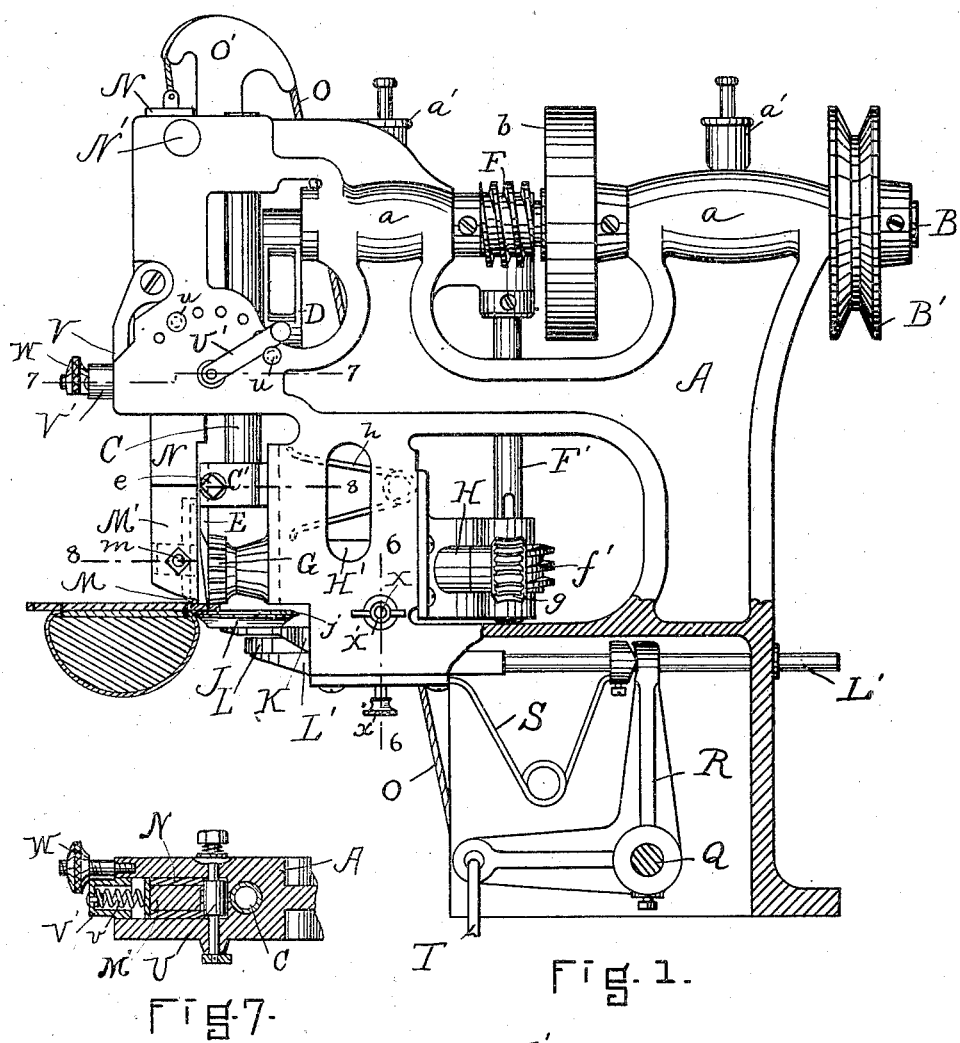

No. 622,460. Patented Apr. 4, 1899.
F. J. FREESE.
TRIMMING AND CHANNELING MACHINE.
(Application filed Feb. 23, 1895.)
(No Model.) 3 Sheets—Sheet 1.

WITNESSES.
Matthew M. Blunt
Samuel P. Thrasher

INVENTOR.
Francis J. Freese
by N. H. Freese
ATT'Y.

No. 622,460. Patented Apr. 4, 1899.
F. J. FREESE.
TRIMMING AND CHANNELING MACHINE.
(Application filed Feb. 23, 1895.)
(No Model.) 3 Sheets—Sheet 2.
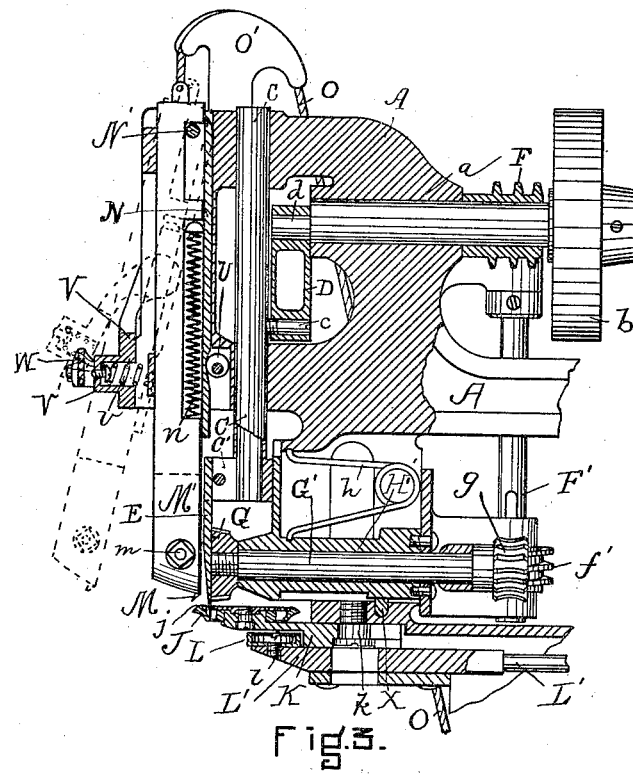
Fig. 3.
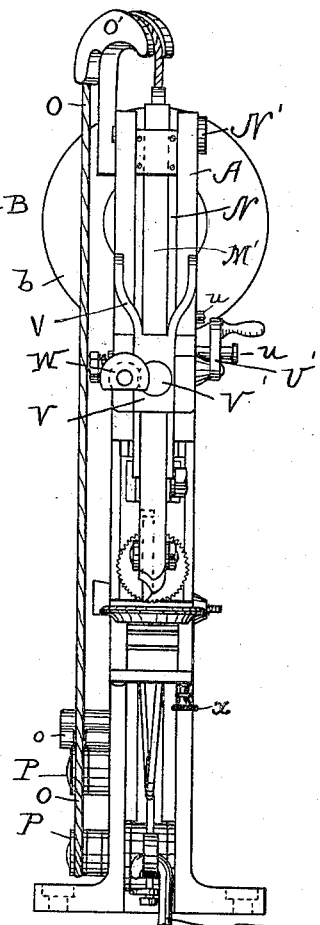
Fig. 4.
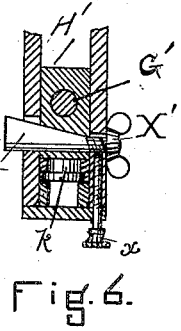
Fig. 5.
Fig. 6.
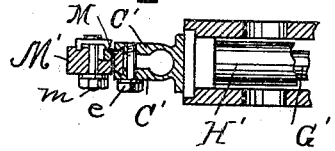
Fig. 8.
WITNESSES.
Matthew M. Blunt.
Samuel P. Thrasher
INVENTOR.
Francis J. Freese
by A. H. Spencer
ATT'Y.

No. 622,460. Patented Apr. 4, 1899.
F. J. FREESE.
TRIMMING AND CHANNELING MACHINE.
(Application filed Feb. 23, 1895.)

(No Model.) 3 Sheets—Sheet 3.

WITNESSES.
Matthew M. Blunt.
Samuel P. Thrasher.

INVENTOR.
Francis J. Freese
by A. H. Reeves
ATT'Y.

UNITED STATES PATENT OFFICE.

FRANCIS JOSEPH FREESE, OF LOWELL, MASSACHUSETTS.

TRIMMING AND CHANNELING MACHINE.

SPECIFICATION forming part of Letters Patent No. 622,460, dated April 4, 1899.

Application filed February 23, 1895. Serial No. 539,330. (No model.)

*To all whom it may concern:*

Be it known that I, FRANCIS JOSEPH FREESE, of Lowell, in the county of Middlesex and State of Massachusetts, temporarily residing in Montreal, Canada, have invented certain new and useful Improvements in Trimming and Channeling Machines, of which the following, taken in connection with the accompanying drawings, is a specification.

My invention combines in one machine mechanism for channeling the outsole of a lasted shoe and simultaneously trimming or cutting away a strip of the surplus leather at or outside of the proper line of the sole edge and also by continuous use of the same cutter for trimming around the heel-seat of such shoe. My apparatus is so constructed that during the channeling operation the trimming-knife is guided mechanically from the inseam and afterward is guided from the counter while trimming around the heel-seat. The channeling-knife is also guided from the inseam, except for a brief period as it approaches the shank just before it is raised out of action, so as not to channel the heel portion of the sole. This raising is effected by a treadle and compound pulley or other devices. Along the shank the channeling-knife before it is raised is moved slightly outward from the trimming-knife toward the longitudinal center of the sole by devices controlled by the operator, so as to form the termination of the channel somewhat nearer said center. Two rotatable guides are employed, one bearing edgewise on the inseam for use during the channeling and while the shank and front portion of the sole are being trimmed and the other brought forward by the operator and bearing against the counter or heel portion of the shoe while trimming around the heel-seat. The first of these guides, as herein shown, has a non-rotary upper face with one or more slots therein to receive the tip of the trimming-knife, which has a very short and rapid reciprocating stroke, to cut away the marginal strip from the sole-stock. A rotating serrated feed-wheel presses this margin which is to be cut away against the upper face of said guide and moves the shoe forward against the knives while it is supported by the hands of the workman. Suitable gearing reduces the feed movement properly as compared with the cutting movement, and the feed-wheel and parts immediately connected with it may rise and fall slightly, according to the thickness of the stock. A transverse wedge or equivalent device controls this vertical movement. The channel-knife carrier may swing outwardly for convenience in inserting or adjusting the two knives.

The machine is operative as a trimmer when the channeling-knife and its appurtenances are dormant, and it may also channel without trimming, if desired.

Figures 2, 7:
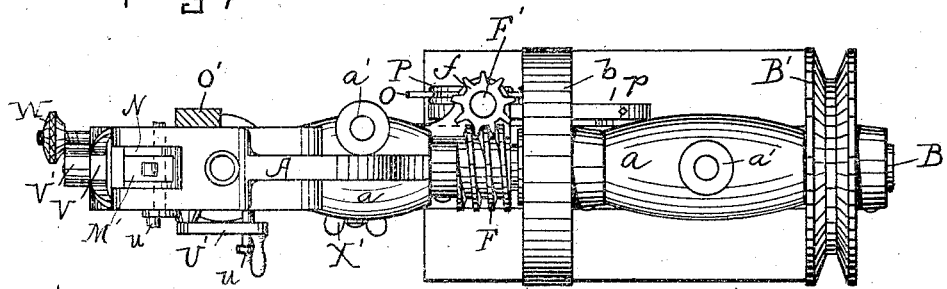
Figure 9:
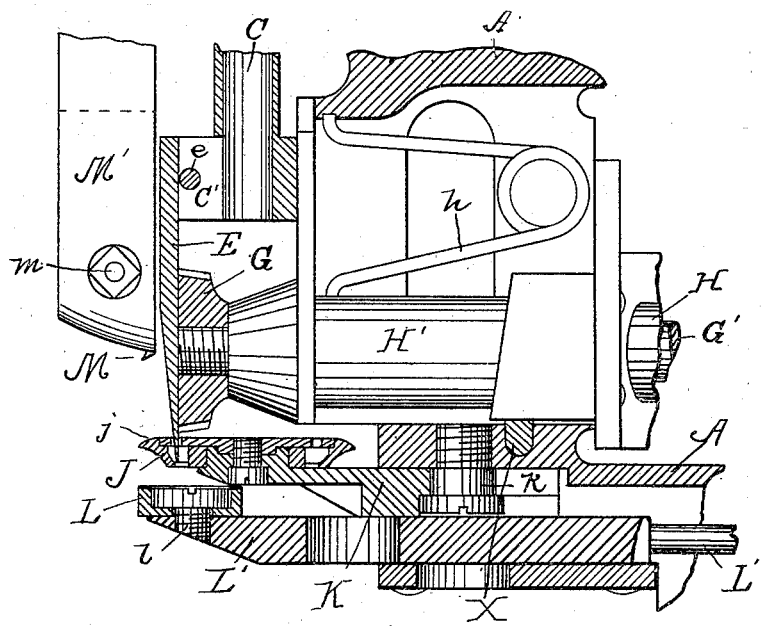
Figure 10:
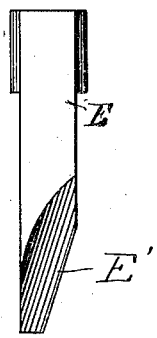

In the drawings, Figure 1 is a side elevation of my combined trimming and channeling machine, partly in section, and represents one of the positions of the shoe under treatment. Fig. 2 is a top plan of the machine; Fig. 3, a vertical section, and Fig. 4 a front or edge view. Figs. 5, 6, 7, and 8 are details hereinafter described, and Fig. 9 is an enlarged view showing the channeling-knife raised and the counter-guide advanced, as when trimming around the heel-seat. Fig. 10 is an elevation of the trimming-knife.

A represents the frame or head of the machine, a thin metallic shell or casting with strengthening-flanges along the edges. This head is in practice fixed to the top of a base or standard to hold it at a convenient height for the workman.

B is the horizontal main shaft, having a driving-pulley B' and fly-wheel $b$ and revolving about four thousand times a minute in antifriction-bearings $a$. Oil-cups $a'$ are shown in Figs. 1 and 2.

C is the vertical trimming-knife carrier, actuated at the same speed by the pitman or connecting-rod D, which engages the stud $c$ on said carrier and the eccentric crank-pin $d$ on the end of the shaft B. The carrier-stem C is made tubular, and the connecting-rod D is recessed, as shown in Fig. 3, for lightness of said parts to lessen the strain due to their rapid reciprocation. The foot of carrier C is formed with lateral flanges C', having dovetail grooves in their inner faces to engage the upper portion of the trimming-knife E. (See Figs. 1, 3, 8, and 9.) A tightening-screw $e$ holds it securely.

The shape of the knife E is best shown in Fig. 10. The upper dovetailed portion held by the flange C', is represented above the shoulders in its sides, while its cutting edge is the oblique portion E' near the tip or extreme lower end, the edge facing the observer in Fig. 1. It is this edge and not the square end which cuts. The stroke is very short—barely three-sixteenths of an inch vertically—perhaps three thirty-seconds of advance.

F is a worm on the main shaft B, meshing with a pinion $f$ on the upper end of a vertical shaft F', the lower end of which has a worm $f'$ keyed to it, which meshes with a worm-gear $g$ on a horizontal shaft G'. The opposite end of this shaft has fixed upon it a serrated feed-wheel G, the outer face of which adjoins the inner face of the knife E. The worm $f'$ is loosely keyed on the shaft F', so that it will move upwardly when the projecting edge of the shoe-sole raises the feed-wheel G, shaft G', and bearings. The bearings of shaft G' are in a flanged casting H, Figs. 3, 6, and 9, bolted to another flanged casting H', Fig. 3, having arms or bosses formed on it as bearings for the shafts F' and G' near the worm and gear, which connect them. The vertical flanges of these two castings bear with a sliding pressure against the front and rear edges of panels of the side frames. (See Figs. 1 and 3.) Thus the feed-wheel G, bearings H H', and connected parts may rise and fall according to the varying thickness of the leather of the sole edge.

From the description it will be seen that while the shaft B makes its four thousand turns a minute—for instance, the speed of rotation of the feed-wheel is very moderate owing to the two worm-gear connections—I adjust the movement so that the shoe will be turned as rapidly as the workman can conveniently handle it, but always slower than the horizontal advance of the cutting edge of the knife E.

Beneath the feed-wheel G, I mount a horizontal guide J, grooved or slotted for the tip of the reciprocating cutter E to work in and having a rotatable edge or rim $j$ for the edge of the shoe at the inseam to bear against, so that it may move freely and yet hold the lasted shoe always at the desired distance from said cutter, or, in other words, cause the trimming to be effected at a defined distance from and on a line parallel with the inseam. This guide may be rotatable as a whole, with an annular groove in its face for the knife-tip to work in, as described and claimed in my application for patent on "sole-trimming machine," filed February 20, 1892, Serial No. 422,182, or its rim only may be rotatable, the center body or upper face being slotted and held from rotation, as described and claimed in my application, Serial No. 539,329, filed simultaneously herewith. I prefer and have herein illustrated this latter form; but I make no claim in this case to such guide separately and apart from its combinations, as shown herewith.

The guide J $j$ is mounted on a horizontal arm K, recessed to receive the machine-screw $k$, Figs. 3 and 9, projecting upwardly into the frame A. The horizontal face of the guide comes directly beneath the feed-wheel G and serves to hold the stock up to said wheel, and thus coöperates in the trimming operation, since the strip to be cut away is pinched between the feed-wheel and guide. I prefer to bevel the feed-wheel slightly, as shown, as it tends to hold the shoe up to the guide and to crowd the strip away from the knife.

The guide J $j$ bears against the inseam from the point where the trimming and channeling begins, at the shank on one side of the sole, to and around the toe of the shoe and to the shank on its opposite side. I provide an additional guide L to regulate the trimming-knife E while trimming around the heel-seat. This guide L is a rotatable wheel or roller pivoted on a stud or screw $l$ on the outer end of a sliding bar L'. (See Figs. 1, 3, and 9.) This bar is brought forward by the operator pressing his foot at the proper time upon a treadle, so as to cause the guide-roll L to bear against the counter or heel portion of the shoe during that part of the operation. This movement is in its last stages simultaneous with the raising of the channeling-knife out of contact with the sole and is accomplished by the same mechanism, as hereinafter described. In Figs. 1 and 3 the parts are shown in their normal position for trimming and channeling, while Fig. 9 shows the additional guide L brought forward and the channeler raised. An adjustable stop on the treadle properly limits its movement.

The channeling-knife M is mounted at the foot and inner face of the channel-knife carrier M', its inclined cutting-point being near to the point of the trimming-knife, as best shown in Fig. 3. It is held fast to its carrier by the bolt $m$, Fig. 8. The carrier M' is mounted in a trough-shaped vertical casing N, which incloses it on three sides. (See Figs. 2, 3, 4, and 7.) Within this casing the carrier M' has a limited upward movement against the resistance of an inclosed spring $n$ for the purpose of raising the channeling-knife M above the sole to avoid channeling the heel-seat. In Figs. 1, 3, and 4 a rope or chain O, attached to carrier M', extends over a curved slide O', fixed to the frame A. This rope extends downwardly to the base of the machine, as in Fig. 4, and there passes around three pulleys P, Fig. 5, two of which are mounted on a lever $p$ on the outside of the frame. The end of the rope or chain is secured to a fixed stud or ring $o$ on the frame. The lever $p$ is firmly secured to a shaft Q, having bearings in the sides of the frame A.

Between the side walls of the frame a bell-crank lever R is fixed upon the shaft Q. (See Fig. 1.) One arm of this lever is connected to the treadle-rope T, Figs. 1, 4, and 5, extending to a treadle. (Not shown.) The other arm bears against a block fixed on the horizontal sliding bar L'; Fig. 1, and when moved forward compresses the spring S and carries the guide-roll L to the front, as in Fig. 9. Depression of the treadle therefore brings the guide-roll L to act against or bear on the heel portion of the lasted shoe and raises the channeling-knife M and its carrier M', so that at the proper moment the channeling devices become dormant. These movements are resisted by the springs S, Fig. 1, and n, (in the casing N,) Fig. 3, as well as by the limited weight of the knife-carrier M'. These forces restore the normal positions of the channeling-knife M and the guide-roll L after the trimming of each shoe-sole is completed. When the treadle is depressed, the action carries the free end of the lever p, Fig. 5, downwardly, and its pulleys P draw the rope O down also, thereby raising the channel-knife carrier M' and advancing the guide-roll L as described with but a limited movement of the treadle. There is sufficient slack in the chain or rope O so that it will not begin to raise the carrier M' until the guide-roll L is almost in its most advanced position, the slack being meanwhile taken up and the two movements being at the last simultaneous. A spring T', Fig. 5, takes up some of the slack and keeps the chain or rope sufficiently taut.

It is desirable to carry the channel at the shank of the shoe somewhat nearer the longitudinal center of the sole than elsewhere and I have provided means for thus changing its terminal portion. An eccentric U, Fig. 3, bears against the inner face of the trough or casing N and may be moved when desired by the workman by means of the lever U', Figs. 1 and 4, attached to the shaft of this eccentric. Stop-pins u, Figs. 1 and 4, limit the oscillation of the lever and the throw of the eccentric.

In Fig. 3 I have illustrated a swinging movement which is allowed to the channel-knife carrier to give access to the knives E and M. The casing N is pivoted at top on a pin N', on which it may swing outwardly, as indicated in dotted lines. A latch V, Figs. 1 and 4, has two diverging arms, pivoted at their upper ends to the frame A, while the lower part of the latch has a hollow hub V', inclosing a spring v, which bears against a crosspiece of the casing serving to keep the carrier M' in its proper position, but allowing the slight yielding movement required by the eccentric U. (See Fig. 7.) The latch V is held in vertical position by a shouldered screw W, entering the edge of frame A and bearing by its shoulder or collar on the outer face of the latch. The head and shoulder of this screw are cut away on one side, Figs. 1 and 4, so that when turned part way around the latch can swing outwardly for adjustment of the knives or otherwise.

In Fig. 6 I have represented at X a wedge-shaped block running under the casting H', which carries the feed-wheel shaft G', and this wedge has a threaded stem, with an adjusting-nut X' thereon, by which the wedge may be moved to adjust said shaft to the desired height. A set-screw x may serve to hold the wedge fast when adjusted.

I claim as my invention—

1. In a trimming and channeling machine, a channeling-knife and a reciprocating trimming-knife having an oblique cutting edge in combination with a rotatable edge-guide having a non-rotary central disk or body slotted to receive the tip of the reciprocating knife, substantially as set forth.

2. In a trimming and channeling machine, a channeling-knife and a reciprocating trimming-knife adapted for simultaneous operation, in combination with a rotatable edge-guide having a non-rotary central body recessed to receive the tip of the trimming-knife, and with a positively-driven feed-wheel serving to press the strip to be removed against the body of said edge-guide, substantially as set forth.

3. The frame A, shaft B and reciprocating trimming-knife E, in combination with a rotatable edge-guide having a broad non-rotary disk or body, in a plane at right angles to the trimming-knife, and recessed to receive the tip of said knife, and with the positively-driven feed-wheel adapted to press the strip to be removed upon the face of said disk or body, substantially as set forth.

4. The combination of the reciprocating trimming-knife E and rotary feed-wheel G, with the edge-guide J j and the laterally-movable guide L, with means to advance and retract it when desired, substantially as set forth.

5. The combination of the channeling-knife, the reciprocating trimming-knife, and the feed-wheel with a rotatable edge-guide operative during the channeling and the trimming of the shank and fore part of the sole, and with an additional guide-roller adapted to be brought forward at the will of the operator and to serve while trimming around the heel-seat, said rotary guides being located in different planes, one above the other, substantially as set forth.

6. The combination of the reciprocating trimming-knife, the rotary feed-wheel and rotatable edge-guide, with the channeling-knife, and the eccentric U and spring v for giving the foot of the channeling-knife carrier a limited sidewise movement, substantially as set forth.

7. The channeling-knife M and its carrier M' and the casing N pivoted at its upper end to the frame, and forming vertical ways for said carrier, in combination with hoisting means adapted to raise said carrier and knife, and with a latch to secure the carrier and casing and release them for a lateral swinging movement, substantially as set forth.

8. The reciprocating trimming-knife E the edge-guide and feed-wheel between which the sole edge passes, and the additional guide L, operative on the counter, in combination with the channeling-knife normally stationary during its action, and with hoisting means adapted to raise the channeler out of contact with the shoe-sole and bring forward the guide L into contact with the counter, substantially as set forth.

9. The channeling-knife M and its carrier M' and the rotatable guide L mounted on the sliding bar L', in combination with the bell-crank lever R, the treadle-rod T, hoisting rope or chain O and the lever p with pulleys P adapted to take up the slack in said rope or chain, substantially as set forth.

10. The reciprocating trimming-knife, the rotatable edge-guide, and the feed-wheel G with its shaft G', in combination with the castings H H' serving as bearings for the shaft G', formed with flanges having a sliding engagement with the vertical frame sides and provided with an arm or boss as bearings for the vertical gearing-shaft, substantially as set forth.

11. The feed-wheel and its horizontal shaft and the flanged castings H H' forming bearings therefor and having a limited vertical movement with relation to the frame, in combination with a transverse wedge and adjusting-screw serving to locate the feed-wheel shaft at the desired height, substantially as set forth.

In testimony whereof I have signed my name to this specification, in the presence of two subscribing witnesses, on this 27th day of December, A. D. 1894.

FRANCIS JOSEPH FREESE.

Witnesses:
A. H. SPENCER,
CHARLES D. KEYES.